Patented Aug. 4, 1953

2,647,904

UNITED STATES PATENT OFFICE 2,647,904

DERIVATIVES OF TROPIC ACID AND PROCESS FOR THE MANUFACTURE THEREOF

Gerald Rey-Bellet, Basel, Switzerland, assignor to Hoffmann-La Roche Inc., Nutley, N. J., a corporation of New Jersey No Drawing. Application March 9, 1951, Serial No. 214,839. In Switzerland April 25, 1950

4 Claims. (Cl. 260—295)

The present invention relates to a process for the manufacture of novel derivatives of tropic acid, namely of tropic acid-N-alkyl-N-(β-picolyl)-amides, the same being represented by the following formula:

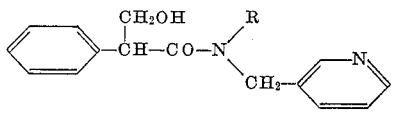

R=lower alkyl radical.

These compounds are valuable medicines, for they are characterized by their marked spasmolytic activity and comparatively large therapeutic margin.

The novel compounds, according to the present invention, can be obtained by reacting tropic acid chloride, which may be acetylated, with an alkyl-(β-picolyl)-amine and, in case the acetylated starting material is used, deacetylating the condensation product. Thus, either tropic acid chloride is reacted with an alkyl-(β-picolyl)-amine, or acetyl tropic acid chloride reacted with an alkyl-(β-picolyl)-amine and the condensation product hydrolyzed to tropic acid-N-alkyl-N-(β-picolyl)-amide.

The alkyl-(β-picolyl)-amines to be used as one of the starting materials can be obtained by reaction of 3-halogenomethyl-pyridine with a primary alkyl amine. Methyl-(β-picolyl)-amine may be prepared for instance as follows:

A solution of 164 parts by weight of β-chloromethyl-pyridine-hydrochloride in 250 parts by weight of water is added dropwise to 600 parts by weight of a 40 per cent, aqueous methylamine solution. The temperature is kept below 50° C. by means of an ice water-bath. The reaction mixture is then stirred for one hour at 20–25° C. and for one further hour at 60° C., it is then cooled down and saturated with potassium carbonate in the cold. Upon extraction with ether, separating the ethereal solution, evaporating the ether and distilling the residue under reduced pressure, the methyl-(β-picolyl)-amine is obtained as a water-clear liquid boiling at 93–95° C./12 mm. Hg. The monohydrochloride of this amine melts at 157–158° C.

When repeating the process outlined above, but using instead of a methylamine solution an ethylamine solution, there is obtained ethyl-(β-picolyl)-amine which is an oil boiling at 92–93° C./10 mm. Hg. Its monohydrochloride has a melting point of 158–160° C.

Example 1

Crude tropic acid chloride obtained from 166 parts by weight of tropic acid with excess thionyl chloride is added dropwise, while stirring, to a solution of 122 parts by weight of methyl-(β-picolyl)-amine (B. P.₁₂ 93–95° C.) and 100 parts by weight of dry pyridine in 750 parts by weight of dry chloroform. By means of an ice water-bath the temperature of the reaction is prevented from rising above 20° C.

After termination of the reaction, the chloroform solution is washed with water, diluted with 400 parts by weight of ether and shaken with 3-normal hydrochloric acid.

Active carbon is added to the hydrochloric acid solution, the mixture is filtered and an excess of concentrated ammonia is added to the filtrate in the cold, whereby the tropic acid-N-methyl-N-(β-picolyl)-amide precipitates. The latter is taken up in chloroform, dried over sodium sulphate and freed from chloroform by distillation. By recrystallization of the distillation residue from ethyl acetate, the tropic acid-N-methyl-N-(β-picolyl)-amide is obtained in the form of colorless crystals of melting point 92–93° C.

Example 2

Acetyl-tropic acid chloride obtained from 50 parts by weight of tropic acid by the action of acetyl chloride and subsequent treatment with excess thionyl chloride is added in portions, with stirring and cooling with ice water, to a mixture of 41 parts by weight of ethyl-(β-picolyl)-amine (B. P.₉ 97–100° C.) and 50 parts by weight of dry pyridine in 250 parts by weight of dry chloroform. After termination of the addition, the mixture is stirred for a further ½ hour at room temperature.

The chloroform solution is then washed with water, diluted with 200 parts by weight of ether and shaken with 3 N-hydrochloric acid. The solution, weakly acid to Congo, is warmed on a steam-bath for 1 hour, whereby the acetyl group of the reaction product is split off; after addition of active coal the mixture is filtered and excess concentrated ammonia is added to the filtrate. The precipitated condensation product is taken up in chloroform, the chloroform solution is dried with sodium sulphate and distilled. The distillation residue, tropic acid-N-ethyl-N-(β-picolyl)-amide, is a thick, yellow oil the hydrochloride of which melts at 156–157° C.

I claim:

1. A tropic acid-N-lower-alkyl-N-(β-picolyl)-amide having the formula

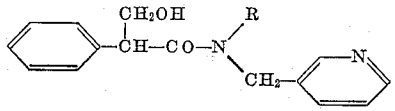

wherein R represents a lower alkyl radical.
2. A process which comprises reacting acetyltropic acid chloride with a lower alkyl-(β-picolyl)-amine and hydrolyzing to produce a product according to claim 1.
3. Tropic acid-N-methyl-N-(β-picolyl)-amide having the formula
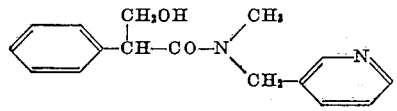
4. Tropic acid - N - ethyl - N - (β - picolyl)- amide having the formula
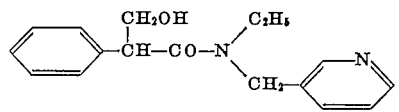
GERALD REY-BELLET.
No references cited.